United States Patent [19]

Brolund et al.

[11] 4,106,183

[45] Aug. 15, 1978

[54] COMBINED PUNCH PRESS AND CUTTING TORCH WITH WORKPIECE SUPPORTING MEANS

[75] Inventors: Theodore F. Brolund, Rockford; William B. Scott, Rochelle; Merle R. Pauley, Rockford, all of Ill.

[73] Assignee: W. A. Whitney Corp., Rockford, Ill.

[21] Appl. No.: 754,826

[22] Filed: Dec. 27, 1976

[51] Int. Cl.² .................... B27P 23/06; B26B 7/06; B23S 3/00
[52] U.S. Cl. ............................ 29/564; 83/409; 266/65; 266/160; 269/289 MR; 269/310
[58] Field of Search ............... 29/564, 56.5; 83/409, 83/410, 414, 648; 266/65, 160; 269/289 MR, 310

[56] References Cited

U.S. PATENT DOCUMENTS 4,063,059  12/1977  Brolund et al. ............ 266/65 X

Primary Examiner—Othell M. Simpson
Attorney, Agent, or Firm—Leydig, Voit, Osann, Mayer & Holt, Ltd.

[57] ABSTRACT

A workpiece is shifted forwardly and rearwardly beneath a punch and a transversely spaced cutting torch by a work table formed with a comparatively wide fore-and-aft extending throat for accommodating a die and a duct which underlie the punch and the torch, respectively. The throat is partially filled by platforms which normally support the overlying portions of the workpiece to reduce deflection thereof but which are adapted to be automatically moved out of the way of the rear of the table when the table is shifted forwardly.

3 Claims, 6 Drawing Figures

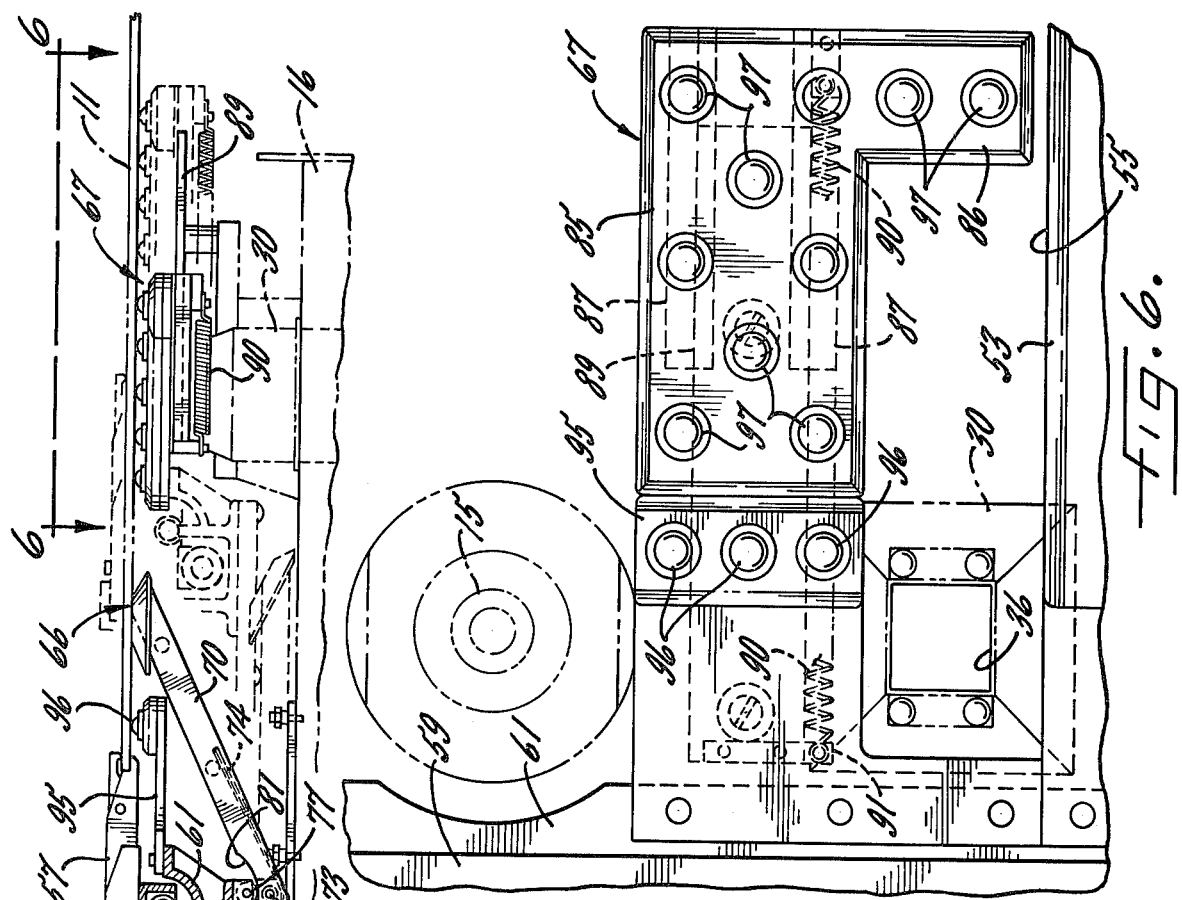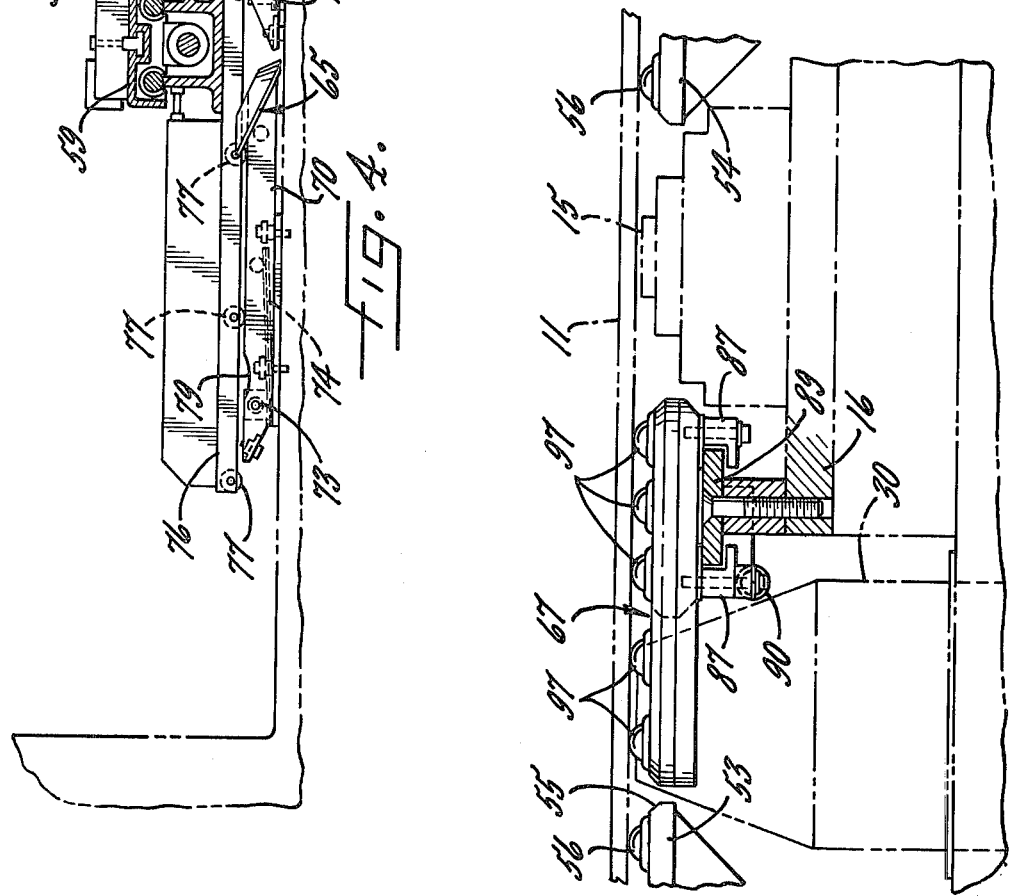

COMBINED PUNCH PRESS AND CUTTING TORCH WITH WORKPIECE SUPPORTING MEANS

BACKGROUND OF THE INVENTION

This invention relates to a punch press for forming holes in a workpiece. The invention more particularly relates to apparatus in which a melting tool such as a plasma-arc torch acts in conjunction with the punch press. The combination of a punch press and a plasma-arc torch is disclosed in Brolund et al U.S. application Ser. No. 735,087, filed Oct. 22, 1976, now U.S. Pat. No. 4,063,059 entitled Punch Press With Cutting Torch and assigned to the assignee of the present invention.

As disclosed in the Brolund et al application, the punch press includes a reciprocating punch which coacts with an underlying die to form comparatively small and substantially regularly shaped holes in the workpiece. The plasma-arc torch is spaced transversely from the punch and is used to cut sections from the workpiece and to form large and irregularly shaped holes in the workpiece. The torch operates by ionizing a column of gas with an electric arc to produce temperatures up to 30,000° F. As the high velocity, high temperature plasma stream strikes the workpiece, the heat instantly melts the metal while the stream blows the molten metal downwardly away from the workpiece. A duct is disposed just beneath the workpiece in alinement with the torch and serves to collect the molten metal.

The workpiece is supported on a table which is adapted to be moved in a fore-and-aft direction on a frame or a bed in order to shift the workpiece to various fore-and-aft positions relative to the punch and the torch. Carried on the rear of the table are one or more clamps having upper and lower jaws for gripping the rear edge of the workpiece. The clamps may be shifted transversely on the table to move the workpiece to various transverse positions beneath the punch and the torch.

To enable the workpiece table to move forwardly past the die and the duct, the table is formed by two conjointly movable sections which are spaced apart so as to define a fore-and-aft extending throat in the table. As a result of the throat, the table may be moved forwardly to positions in which the two table sections straddle the die and the duct. Being required to accommodate both the die and the transversely spaced duct, the throat is relatively wide and thus a gap of considerable width is left between the two table sections so that the portion of the workpiece overlying the throat is not supported by the table sections.

SUMMARY OF THE INVENTION

The primary aim of the present invention is to provide a new and improved punch press of the above type in which one or more platforms are uniquely disposed within the throat between the table sections and are adapted to support the overlying portions of the workpiece so as to reduce deflection of the edge portions and any thin projecting portions of the workpiece and thereby prevent such portions from engaging and being bent by the sides of the table sections.

Another object is to provide platforms which normally are adapted to support the workpiece but which automatically move out of the way of the rear of the table when the table is moved forwardly.

A more detailed object is to provide a workpiece-supporting platform located rearwardly of the die and duct and adapted to swing downwardly out of the way of the rear of the table, and further to provide a second platform located between the die and the duct and adapted to slide forwardly out of the way of the rear of the table.

These and other objects and advantages of the invention will become more apparent from the following detailed description when taken in conjunction with the accompanying drawings.

BRIEF DESCRIPTION OF THE DRAWINGS

FIG. 2 is an enlarged fragmentary cross-section taken substantially along the line 2—2 of FIG. 1.

FIG. 3 is a fragmentary cross-section taken substantially along the line 3—3 of FIG. 2.

FIG. 4 is a view similar to FIG. 3 but shows certain parts in moved positions.

FIG. 5 is an enlarged fragmentary cross-section taken substantially along the line 5—5 of FIG. 3.

FIG. 6 is an enlarged plan view of certain parts as viewed along the line 6—6 of FIG. 4.

DETAILED DESCRIPTION OF THE PREFERRED EMBODIMENT

Figure 1:
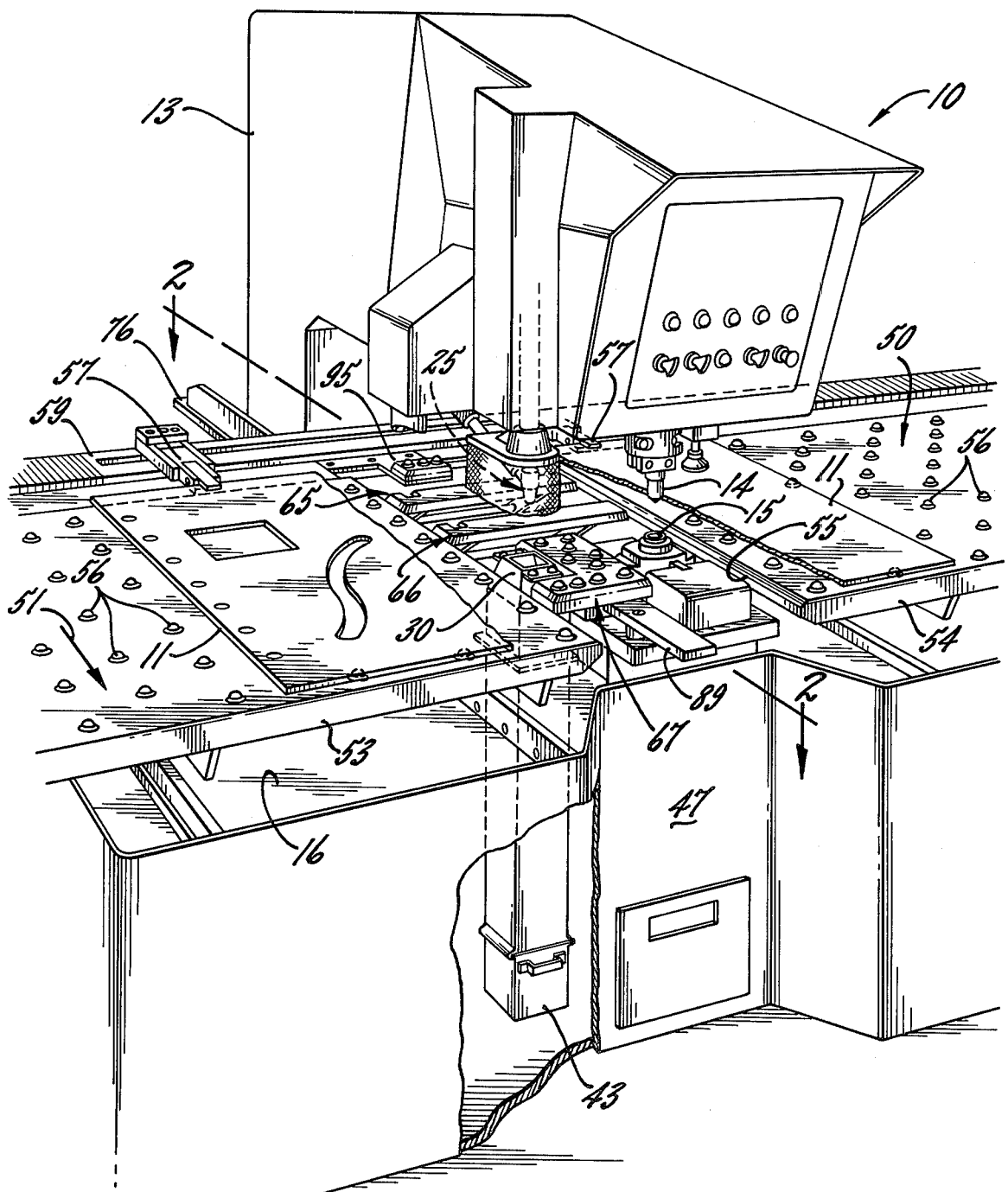
FIG. 1 is a fragmentary perspective view of an exemplary punch press having a plasma-arc torch and incorporating the new and improved features of the present invention.

The present invention is illustrated in the drawings in conjunction with a punch press 10 which may be used for forming holes in a workpiece 11 which herein is shown as a flat piece of sheet metal. The press includes a conventional C-shaped support or frame 13 housing a hydraulic actuator (not shown) which is adapted to reciprocate a punch 14. A die assembly 15 underlies the workpiece and is disposed in vertical alinement with the punch to coact with the latter and form a hole in the workpiece when the punch is shifted downwardly. The die assembly is supported on an underlying bed 16 which constitutes part of the frame of the press.

To increase the versatility and productivity of the press 10, a metal melting tool which herein is in the form of a plasma-arc torch 25 is attached to one side of the C-frame 13 and is adapted to cut large and irregularly contoured shapes out of the workpiece. Plasma-arc torches such as the torch 25 are commercially available as, for example, from Thermal Dynamics Corporation of West Lebanon, New Hampshire. Basically, such a torch includes a tip defining a small orifice through which an ionized column of gas and an electric arc are forced. The plasma stream and the electric arc (hereinafter called the plasma-arc) are discharged from the orifice at high velocity and produce extremely high temperatures to cause instantaneous melting of the underlying portion of the workpiece 11 and to blast the molten metal downwardly from the workpiece. This process makes a clean, high speed cut with little slag formation and is generally accepted as the preferred method of cutting sections up to 6" thick from stainless steel and non-ferrous or clad metals that are not easily cut by oxygen fuel gas processes.

With the plasma-arc torch 25 mounted on the press frame 13, the punch 14 can be used to form small and regularly shaped holes in the workpiece 11 while the torch can be used in place of a nibbling operation to rapidly cut larger holes and to form irregularly shaped cuts or openings. Also, the punch may be used to form a starting hole in the workpiece section or sections to be cut by the torch and thereby eliminate direct downward impingement of the plasma-arc on solid metal. This reduces the danger of the torch becoming plugged by metal which otherwise might splatter upwardly upon initial contact of the plasma-arc with the workpiece 11.

During operation of the torch 25, hot fumes and molten metal are produced. The molten metal and the fumes are directed into an upright duct 30 (see FIGS. 2 and 4) secured to the bed 16 and located in vertical alinement with the tip of the torch 25, the duct thus being spaced transversely from the die 15. Herein, the duct is made of sheet metal and its upper end is formed with a central rectangular opening 36 (FIG. 6) which is coaxial with the tip of the torch 25. The upper end of the duct is located in contact with the lower side of the workpiece 11. As shown in FIG. 1, the duct leads downwardly to a receptacle such as a bucket 43 for collecting the molten metal blown downwardly from the workpiece 11. The bucket 43 is attached releasably to the lower end of the duct and is located within an opening in a panel 47 which covers the front of the bed 16. Smoke and other fumes resulting from operation of the torch 25 are disposed of by means of a vacuum system or unit (not shown) which communicates with the duct 30 by means of a flexible hose (not shown) which is connected to the lower portion of the duct above the bucket 43. Reference may be had to the aforementioned Brolund et al application for a detailed disclosure of the construction and operation of the vacuum system.

To move the workpiece 11 to various positions beneath the punch 14 and the torch 25, the workpiece is supported on a table 50 which, in turn, is mounted to move back and forth in the direction of the arrow 51 on the underlying bed 16. The table actually is formed by left and right sections 53 and 54 which are spaced transversely from one another so as to leave a fore-and-aft extending space or throat 55 (FIGS. 1 and 2) located between the two sections and opening out of the front of the table. The throat 55 is alined with the die 15 and the duct 30 and is wider than the transverse dimension between the right-hand side of the die and the left-hand side of the duct. As a result of the throat, the table 50 may be driven forwardly to positions in which the two table sections 53 and 54 straddle the die and the duct and thus virtually all areas of the workpiece 11 may be moved beneath the punch 14 and the torch 25. The two table sections move in unison with one another and are driven back and forth on the bed 16 by a screw mechanism (not shown) located beneath the table.

The table 50 supports anti-friction balls 56 which allow the workpiece 11 to move in the transverse direction (i.e., left to right or vice verse) across the table and beneath the punch 14 and the torch 25. To effect such movement, two clamps 57 (FIGS. 1 to 3) are carried on the back of the table, grip the rear margin of the workpiece and are adapted to be driven transversely along the table to shift the workpiece. Each clamp includes upper and lower horizontally extending jaws which respectively engage the upper and lower sides of the workpiece. The clamps are mounted on a carriage 59 (FIGS. 2 and 3) which is guided by transversely extending rods 60 located on a cross member 61 connected to and extending along the rear of the table and spanning the throat 55 between the table sections 53 and 54. A screw mechanism 63 (FIG. 3) is operably connected between the cross member 61 and the carriage 59 and shifts the carriage on the cross member to move the clamps 57 and the workpiece 11 transversely relative to the table.

In accordance with the present invention, platforms 65, 66 and 67 are located within the throat 55 between the table sections 53 and 54 and support those portions of the workpiece 11 which overlie the throat so as to reduce vertical deflection of the overlying workpiece and particularly to reduce deflection of the edge portions of the workpiece and of thin portions which may be left as a result of the cutting operation. As the table 50 moves forwardly to position the rear portion of the workpiece beneath the punch 14 and/or torch 25, the platforms 65, 66 and 67 are automatically moved out of the way of the rear portion of the table so as to enable the table to shift forwardly as necessary.

More specifically, the platforms 65 and 66 are positioned rearwardly of the die 15 and the duct 30 and are located in fore-and-aft spaced relationship within the throat 55. Each of the platforms 65, 66 extends across substantially the entire width of the throat and is supported on the upper ends of a pair of arms 70 and 71 (FIGS. 2 and 3) which extend upwardly and forwardly from the bed 16 and whose lower end portions are connected pivotally to the bed as indicated at 73 to swing about a horizontal axis. A cantilevered leaf spring 74 is located between the arms of each pair and its upper end portion bears against a rod 75 extending transversely between the arms, the lower end portion of the spring being secured to the bed. The springs urge the platforms 65 and 66 upwardly to active positions in which the upper sides of the platforms either engage the underside of the workpiece 11 or are located very closely adjacent the underside of the workpiece. Accordingly, the platforms 65 and 66 normally support these portions of the workpiece that overlie the comparatively wide throat 55 and thus the platforms prevent the edge portions of a thin workpiece from deflecting downwardly into the throat and prevent those portions from engaging and being bent by the sides of the table sections 53 and 54 when the workpiece is advanced transversely. The platforms also prevent deflection of narrow and flexible sections which may be left in the workpiece as a result of the cutting operation.

Figures 2, 3:
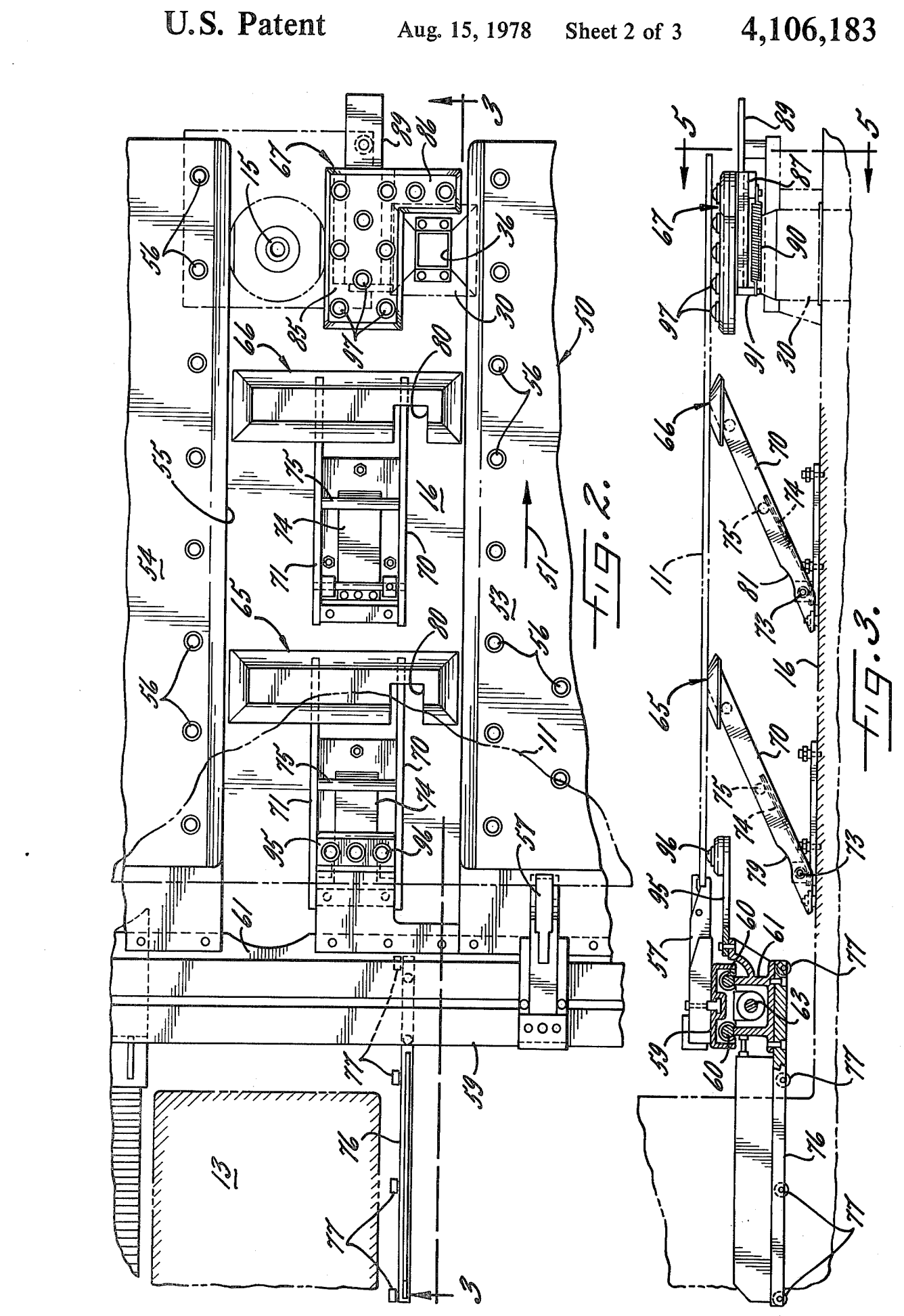

As a result of being pivotally mounted, the platforms 65 and 66 are capable of swinging downwardly and moving to inactive positions out of the way of the rear cross member 61 of the table 50 when the latter is shifted forwardly. As shown in FIGS. 2 and 3, a bar 76 is attached to and extends rearwardly from the cross member and is located in fore-and-aft alinement with the arms 70 of the platforms 65 and 66. Carried on the bar 76 are abutment means which herein are in the form of four rollers 77 journaled on and spaced along the bar.

When the table 50 is shifted forwardly, the leading roller 77 engages a shallow depression 79 (FIGS. 3 and 4) formed in the arm 70 of the rear platform 65, such engagement occurring prior to engagement of the platform or the arms 70 and 71 by any other part of the table. As the table continues forwardly, the leading roller 77 cams the arm 70 downwardly (see FIG. 4) to swing the rear platform 65 downwardly to an inactive position in which the platform is located below the cross member 61 so as to permit the cross member to move forwardly past the platform. With continued forward movement of the table, the leading roller 77 passes through a notch 80 (FIG. 2) in the platform 65 while the trailing rollers on the bar 76 successively engage the arm 70 to hold the platform in its downwardly cammed position. The leading roller then engages a depression 81 in the arm 70 of the forward platform 66 as shown in full lines in FIG. 4 and ultimately cams that platform downwardly as shown in dotted lines. Accordingly, the platforms 65 and 66 are automatically moved out of the way of the rear cross member 61 of the table 50 as the latter is shifted forwardly. When the table is retracted rearwardly, the rollers 77 move off of the arms 70 to enable the forward platform 66 and then the rear platform 65 to swing upwardly to their active positions shown in FIG. 3.

The platform 67 is generally L-shaped and includes a fore-and-aft extending portion 85 (FIG. 2) normally located between the die 15 and the duct 30 and a transversely extending portion 86 located in front of the duct. In keeping with the invention, the platform 67 is supported on the bed 16 to slide between a rear position shown in full lines in FIG. 4 and a forward position shown in dotted lines. For this purpose, a pair of L-shaped guides 87 (FIG. 5) are attached to the lower side of the fore-and-aft extending portion 85 of the platform 67 and straddle a fore-and-aft extending bar 89 which is connected to the bed 16. A contractile spring 90 is connected at its forward end to one of the guides and at its rear end to a depending finger 91 on the rear portion of the bar 89. The spring 90 normally urges the platform 67 to its rearward position but enables the platform to slide forwardly on the bar 89 and out of the way of the rear of the table 50 when the latter is shifted to its extreme forwardmost position.

To slide the platform 67 forwardly, a second abutment means is attached to the rear cross member 61 of the table 50 and is in the form of a small table section 95 (FIGS. 4 and 6) which is located within the throat 55 and which projects a short distance forwardly of the cross member 61. The rear table section 95 is of such width as to be capable of moving between the die 15 and the duct 30 and carries anti-friction balls 96 (FIG. 6) which are disposed at the same elevation as the balls 56 of the main table sections 53 and 54. Similarly located balls 97 are supported on the platform 67 to reduce friction when the workpiece 11 is shifted by the clamps 57 and also when the platform moves forwardly or rearwardly beneath the workpiece.

The platform 67 normally is disposed in its rear position shown in FIG. 2 and thus supports and reduces deflection of those portions of the workpiece 11 located between the die 15 and the duct 30 and located just forwardly of the duct. As the table 50 is shifted toward its extreme forwardmost position, the front edge of the rear table section 95 engages the rear edge of the platform 67 and pushes the platform forwardly out of the way of the rear of the table 50 and out of the way of any clamp 57 which might happen to be positioned immediately over the rear table section (see FIG. 6). With continued forward shifting of the table, the rear table section 95 moves between the die 15 and the duct 30 and occupies the space formerly occupied by the fore-and-aft portion 85 of the platform 67 so as to support and prevent deflection of the overlying portion of the workpiece 11 during cutting. When the table 50 shifts rearwardly, the rear table section 95 retracts away from the platform 67 to enable the spring 90 to return the platform rearwardly to its normal position.

From the foregoing, it will be apparent that the present invention brings to the art new and improved punch press and cutting torch apparatus in which the platforms 65, 66 and 67 partially fill the throat 55 between the table sections 53 and 54 and reduce deflection of the workpiece 11, the invention serving to particular advantage when a comparatively thin and flexible workpiece is being handled. The platforms are automatically moved out of the way of the rear of the table 50 when the table is shifted forwardly and then automatically return to their normal positions when the table is retracted and thus the platforms do not restrict the freedom of movement of the table.

We claim:

1. A punch press comprising a frame and a vertically reciprocable punch, a die on said frame in underlying relation with said punch and adapted to coact with said punch to form a hole in an intervening workpiece when said punch is advanced downwardly, a metal cutting tool mounted in a horizontally stationary position on said frame in transversely spaced relation with said punch and operable to emit downwardly directed energy for melting said workpiece, an upright duct on said frame beneath said workpiece and alined with said tool whereby molten metal from said workpiece is directed downwardly into said duct, a table for supporting said workpiece and movable back and forth in a fore-and-aft direction on said frame to locate said workpiece in various fore-and-aft positions beneath said punch and said tool, said table being formed by a first section located on one side of said die and said duct and by a conjointly movable second section located on the opposite side of said die and said duct, there being a fore-and-aft extending throat between said table sections to permit said table to move forwardly to positions in which said table sections straddle said die and said duct, first and second platforms each having an upper surface for supporting said workpiece, each of said platforms being disposed between said table sections and located within said throat in at least some positions of said table, said first platform being located rearwardly of said die and said duct, said second platform being located between said die and said duct, abutment means on the rear portion of said table and successively engageable with said first and second platforms as said table is moved forwardly, and means mounting each platform on said frame for movement relative to said table and said frame and permitting each platform to move out of the way of said abutment means when said platform is engaged by said abutment means.

2. A punch press as defined in claim 1 in which said mounting means support said first platform to swing downwardly and support said second platform to slide forwardly when said platforms are engaged by said abutment means, and resilient means connected to said frame and urging said first platform upwardly and said second platform rearwardly.

3. A punch press as defined in claim 2 in which said second platform is generally L-shaped and includes a first portion located between said die and said duct and further includes a transversely extending second portion located in front of said duct.

* * * * *